(12) United States Patent
Luo

(10) Patent No.: US 10,518,297 B2
(45) Date of Patent: Dec. 31, 2019

(54) DISPLAY MODULE TERMINAL CLEANSING DEVICE AND CLEANSING METHOD

(71) Applicant: Wuhan China Star Optoelectronics Semiconductor Display Technology Co., Ltd., Wuhan, Hubei (CN)

(72) Inventor: Jing Luo, Guangdong (CN)

(73) Assignee: Wuhan China Star Optoelectronics Semiconductor Display Technology Co., Ltd., Wuhan, Hubei (CN)

( * ) Notice: Subject to any disclaimer, the term of this patent is extended or adjusted under 35 U.S.C. 154(b) by 221 days.

(21) Appl. No.: 15/570,271

(22) PCT Filed: Aug. 31, 2017

(86) PCT No.: PCT/CN2017/100017
§ 371 (c)(1),
(2) Date: Oct. 27, 2017

(87) PCT Pub. No.: WO2019/019254
PCT Pub. Date: Jan. 31, 2019

(65) Prior Publication Data
US 2019/0022712 A1    Jan. 24, 2019

(30) Foreign Application Priority Data

Jul. 24, 2017    (CN) .......................... 2017 1 0604664

(51) Int. Cl.
*B08B 5/02* (2006.01)
*B08B 1/00* (2006.01)
(Continued)

(52) U.S. Cl.
CPC ................. *B08B 5/02* (2013.01); *B08B 1/006* (2013.01); *B08B 1/008* (2013.01);
(Continued)

(58) Field of Classification Search
CPC ........... B08B 5/02; B08B 1/008; B08B 1/006; G02B 27/0006; G02F 1/1309; G02F 2001/1316
See application file for complete search history.

(56) References Cited

FOREIGN PATENT DOCUMENTS

| CN | 1994589 A | 7/2007 |
|---|---|---|
| CN | 201136120 Y | 10/2008 |

(Continued)

OTHER PUBLICATIONS

First Office Action of CN2017106046642.

*Primary Examiner* — David Redding
(74) *Attorney, Agent, or Firm* — Andrew C. Cheng

(57) ABSTRACT

A display module terminal cleansing device includes a wiper assembly and a gas blower assembly. The gas blower assembly is first operated to blow away particle foreign substances located on a terminal area to be cleansed. And, then, the wiper assembly is operated to wipe off foreign substances remaining on the terminal area. The display module terminal cleansing device may achieve an effect of cleansing where water droplet angle on the surface of the cleansed terminal area is less than 15° and also prevents a potential issue of scratching and damaging the display module during the process of cleansing. Also disclosed is a display module terminal cleansing method.

14 Claims, 2 Drawing Sheets

(51) Int. Cl.
  *G02F 1/13* (2006.01)
  *G02B 27/00* (2006.01)
(52) U.S. Cl.
  CPC ....... *G02B 27/0006* (2013.01); *G02F 1/1309* (2013.01); *G02F 2001/1316* (2013.01)

(56) References Cited

FOREIGN PATENT DOCUMENTS

| | | | |
|---|---|---|---|
| CN | 101612623 | A | 12/2009 |
| CN | 102784769 | A | 11/2012 |
| CN | 203899975 | U | 10/2014 |
| CN | 104174613 | A | 12/2014 |
| CN | 205608334 | U | 9/2016 |
| JP | 2002050655 | * | 2/2002 |
| JP | 2002336807 | A | 11/2002 |

* cited by examiner

DISPLAY MODULE TERMINAL CLEANSING DEVICE AND CLEANSING METHOD

CROSS REFERENCE TO RELATED APPLICATIONS

This application claims the priority of Chinese Patent Application No. 201710604664.2 filed on Jul. 24, 2017, titled "Display Module Terminal Cleansing Device and Cleansing Method", the disclosure of which is incorporated herein by reference in its entirety.

BACKGROUND OF THE INVENTION

1. Field of the Invention

The present invention relates to a cleansing device, and more particularly to a display module terminal cleansing device and a cleansing method.

2. The Related Arts

The contemporary display modules, such as liquid crystal display modules and organic light-emitting diode (OLED) display modules, require cleansing terminals during an assembly operation of a manufacturing process. The purpose is to remove organic foreign substances (such as remaining adhesives) and large particles of inorganic foreign substances (such as powder dust). The known cleansing methods include two ways of ultrasonic wave based rinsing and wiper cloth in combination with solvent wiping. Since an OLED product is different, in respect of structural characteristics, from an LCD and requires higher level of cleansing of terminals thereof, the conventional cleansing way of wiper cloth in combination with solvent is incapable of removing large particles of inorganic foreign substance (such as powder dust particles) in the first instance so as to easily cause scratching on a flexible backing of an OLED, while the cleansing way of ultrasonic wave based rinsing is incapable of completely removing organic foreign substances, such as adhesives, and foreign substance on the back side of the terminals, and may easily cause defect products resulting from pressing against the foreign substances and cracking of base plates.

SUMMARY OF THE INVENTION

Embodiments of present invention provide a display module terminal cleansing device and a cleansing method, which overcome the technical shortcomings of known display module terminal cleansing device so as to improve the effect of cleansing of display module terminals, the display module terminal cleansing device having a simple structure, not increasing additional expense, and having lowered cost.

In the first aspect, a first embodiment of the present invention provides a display module terminal cleansing device, which is provided to cleanse a terminal area of a display module. The display module terminal cleansing device comprises a gas blower assembly and a wiper assembly. The gas blower assembly is operable to conduct a gas blowing operation to blow particle foreign substances away from the terminal area of the display module. The wiper assembly is operable to remove foreign substances remaining on the terminal area after the gas blowing operation conducted by the gas blower assembly.

In the above display module terminal cleansing device, the wiper assembly is operable in combination with a cleansing solvent to remove the foreign substances remaining on the terminal area.

In the above display module terminal cleansing device, the foreign substances remaining on the terminal area include organic foreign substances, and the cleansing solvent is selected as one of alcohol, propyl alcohol, and isopropyl alcohol according to the remaining foreign substances.

In the above display module terminal cleansing device, the wiper assembly comprises at least two wipe heads, a liquid supply channel arranged in each of the wipe heads, and a piece of wipe cloth wrapped around each of the wipe heads. The liquid supply channel is connected to a cleansing solvent supply section to supply cleansing solvent to the wipe cloth. The wipe heads are operable to drive the wipe cloth that is impregnated with the cleansing solvent to wipe off the foreign substances remaining on the terminal area.

In the above display module terminal cleansing device, the wipe heads each have an end that forms a flat wiping surface. The wipe cloth is wrapped around the flat wiping surface. The liquid supply channel is arranged to extend through an interior of the wipe head. The liquid supply channel has an end connected to the cleansing solvent supply section and an opposite end extending through the flat wiping surface to directly supply the cleansing solvent to the wipe cloth that is wrapped around the flat wiping surface.

In the above display module terminal cleansing device, the gas blower assembly comprises a gas pump and a gas supply channel connected to the gas pump. The gas supply channel is arranged in the interior of the wipe head to extend through the flat wiping surface to supply gas supplied from the gas pump to a portion of the terminal area that opposes the wipe head.

In the above display module terminal cleansing device, the gas blower assembly comprises a clean dry air module that supplies a high-pressure, dry, and clean airflow.

In the above display module terminal cleansing device, the gas blower assembly comprises a gas pump and a gas supply channel connected to the gas pump. The gas pump is operable to supply high-pressure, dry, and clean gas. The gas supply channel supplies the gas to the terminal area.

In the above display module terminal cleansing device, the terminal cleansing device further comprises an installation section and a support section. The installation section allows the wiper assembly to be installed and fixed and drives the wiper assembly to move relative to the terminal area. The support section supports a display module to be cleansed thereon and drives the display module to move relative to the wiper assembly and/or the gas blower assembly.

In the second aspect, another embodiment of the present invention provides a cleansing method, which is used to cleanse a terminal area of a display module. The cleansing method comprises:

providing a display module terminal cleansing device, which comprises a wiper assembly and a gas blower assembly;

fixing a display module to be cleansed on the display module terminal cleansing device;

adjusting a position of the terminal area on the display module terminal cleansing device to have the gas blower assembly and the wiper assembly aligned with the terminal area;

controlling the gas blower assembly to blow away particle foreign substances located on the terminal area; and controlling the wiper assembly to remove other foreign substances remaining on the terminal area.

The display module terminal cleansing device and the cleansing method according to the present invention as provided in the embodiments of the present invention are such that pressurized gas is generated by the gas blower assembly to first blow away particle foreign substances from a surface of a terminal area, and then, foreign substances still remaining on the terminal area is wiped off with a wiper assembly operated in combination with a cleansing solvent, whereby an effect of cleansing where water droplet angle on the surface of the terminal area is less than 15° can be achieved after the cleansing and the potential issue of scratching and damaging the display module during the process of cleansing can be avoided.

BRIEF DESCRIPTION OF THE DRAWINGS

To more clearly explain the technical solution proposed in an embodiment of the present invention and that of the prior art, a brief description of the drawings that are necessary for describing the embodiment or the prior art is given as follows. It is obvious that the drawings that will be described below show only some embodiments of this application. For those having ordinary skills of the art, other obvious variations may be readily available from these attached drawings without the expense of creative effort and endeavor.

DETAILED DESCRIPTION OF THE PREFERRED EMBODIMENTS

Figure 1:
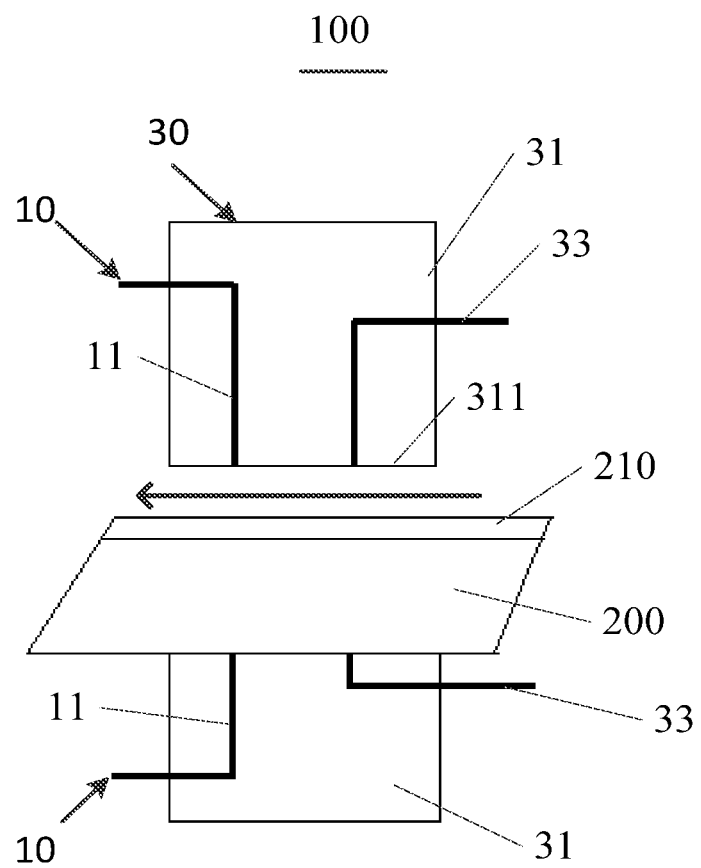
FIG. 1 is a schematic view illustrating a front side structure of a display module terminal cleansing device provided in an embodiment of the present invention.

A clear and complete description will be given to technical solutions provided by embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

In addition, the description given below for each embodiment is made with reference to the attached drawings to exemplify specific embodiments that the present invention may be put into practice. Direction related terminology used in the present invention, such as "up", "down", "front", "rear", "left", "right", "internal", "external", and "lateral", is provided as direction defined in the drawing sheets. Thus, using the direction related terminology, which is for better and more clearly describing and understanding of the present invention and is not for indicating or implying any specific orientation that a device or an element described must take or the device or element must be structured or operated at a specific orientation, should thus be appreciated as not imposing constraints to the present invention.

In the description of the present invention, it should be noted that unless specifically required and set, the terms "installation", "connection", and "jointing" as used herein should be interpreted in a broad way, such as being fixedly connected or removably connected, or integrally connected; or being mechanically connected; or being directly connected, or indirectly connected with intervening media therebetween, or interiors of two element being in communication with each other. For those having ordinary skills in the art, the specific meaning of these terms used in the present invention can be appreciated for any actual situations.

Further, in the description of the present invention, unless stated otherwise, "multiple" means two or more than two. Terms related to "operations", if used in this specification, should means independent operations and for cases where distinction from other operations, any operation that achieve a desired effect of the operation is included in the terms so used. Further, the symbol "-" as used in this specification stands for a numeral range, which comprises a range of which the minimum and the maximum are respectively the figures set in front of and behind "-". In the drawings, units having similar or the same structure are designated with the same reference numerals.

An embodiment of the present invention provides a display module terminal cleansing device, which overcomes the technical shortcomings of a known display module terminal cleansing device in order to further improve an effect of cleansing display module terminal. Further, the display module terminal cleansing device has a simple structure, does not increase additional expense, and has a lowered cost. A detailed description is provided below.

Referring to FIG. 1, FIG. 1 is a schematic view illustrating a front side structure of a display module terminal cleansing device provided in an embodiment of the present invention. The display module terminal cleansing device 100 according to the present invention is provided for cleansing a terminal area 210 of a display module 200. The display module terminal cleansing device 100 comprises a gas blower assembly 10 and a wiper assembly 30. The gas blower assembly 10 is used to blow away particle foreign substances (such as particle like inorganic foreign substances) from the terminal area 210 in order to clear off foreign substances located on the display module 200. The wiper assembly 30 is used to remove other foreign substances (such as organic foreign substances, for example adhesive residues) remaining on the terminal area 210. Further, the wiper assembly 30 is put into operation after the operation of the gas blower assembly 10 in order to ensure no particle foreign substances remain on the terminal area 210 during the wiping operation of wiping and to further improve the result of display module terminal cleansing, thereby eliminating the potential risk of damages of a backing plate located under the terminals resulting from scratching by the particle foreign substances on the terminal area 210 being undesirably moved during the wiping operation. The conventional cleansing operation conducted with wipe cloth in combination with solvent is generally incapable of removing large particles of inorganic foreign substance (such as particles of powder dust) at the first instance and may easily result in scratching of a flexible OLED backing, and the cleansing operation of ultrasonic wave based rinsing is generally incapable of completely removing organic foreign substances, such as adhesives, and foreign substances attached to the back side of the terminals and may easily result in defect products caused by pressing foreign objects and cracking of base plate.

An embodiment of the present invention provides a display module terminal cleansing device, which first operates a gas blower assembly 10 to blow away particle foreign substances (such as particle like inorganic foreign substances), for example powder dust, from the terminal area 210 and then, operates a wiper assembly 30 to wipe the terminal area 210 so as to effectively remove other foreign substances (such as organic foreign substances, for example adhesive residues) remaining on the terminal area 210, but does not cause scratching of the backing plate of the terminal area 210 due to no particle foreign substance existing. Apparently, the display module terminal cleansing device of the present invention ensures excellent result of cleansing and also achieves safe cleansing without damaging the display module.

In an embodiment of the present invention, the gas blower assembly 10 comprises a clean dry air (CDA) module, which supplies a dry and clean gas of high pressure so that the dry and clean pressurized gas may be used to blow away particle foreign substances located on the terminal area 210 to prevent the wiper assembly 30 rubbing the particle like inorganic foreign substances to scratch the backing plate of the terminal area 210 during a subsequent operation of wiping the terminal area 20 with the wiper assembly 30. In the embodiments of the present invention, the gas blower assembly 10 comprises a gas supply channel 11 and a gas pump (not shown). The gas supply channel 11 is connected to the gas pump for supplying pressurized gas generated by the gas pump to a surface of the terminal area 210 so that the high pressure gas flow supplied through the gas supply channel 11 may blow away the particle foreign substances located on the surface of the terminal area 210.

In an embodiment of the present invention, the gas blower assembly 10 is directly fixed at a location aligned with the terminal area 210 of the display module 200. In another embodiment of the present invention, the gas blower assembly 10 is fixed and retained on a movable retention seat and the gas blower assembly 10 is moved with the retention seat to a location aligning with the terminal area 210.

In an embodiment of the present invention, the wiper assembly 30 is used in combination with a cleansing solvent to remove other foreign substances (such as organic foreign substances, for example adhesive residues) remaining on the terminal area 210.

In an embodiment of the present invention, the cleansing solvent comprises at least one of the following: alcohol, propyl alcohol, and isopropyl alcohol. The present invention provides no specific limitation to the cleansing solvent and one or more cleansing solvents may be selected according to the foreign substance residues on the terminal area 210.

In an embodiment of the present invention, the wiper assembly 30 comprises at least two wipe heads 31, liquid supply channels 33 arranged in the wipe heads 31, and pieces of wipe cloth (not shown) wrapped around the wipe heads 31. The liquid supply channels 33 are connected to a cleansing solvent supply source (not shown) to supply the cleansing solvent to the wipe cloth. The at least two wipe heads 31 are arranged in a direction parallel to the terminal area 210 and are opposite to and spaced from each other. In other words, the at least two wipe heads 31 are respectively arranged to line up on each of two opposite sides of the terminal area 210 and the wipe heads 31 lined up on one of the two sides of the terminal area 210 are opposite to and spaced from the wipe heads 31 lined up on the other one of the two sides of the terminal area 210. Further, the wipe heads 31 that are located on the two opposite sides of the terminal area 210 are arranged to correspond to each other in a one-to-one manner so that the pieces of wipe cloth wrapped around the wipe heads 31 may respectively set into contact engagement to clamp opposite surfaces of the terminal area 210 located between two corresponding ones of the wipe heads 31, whereby the pieces of wipe cloth wrapped around the wipe heads 31 may simultaneously wipe the two opposite surfaces of the terminal area 210.

In an embodiment of the present invention, the wipe heads 31 are each in the form of a cylinder having an end forming a flat wiping surface 311. The wipe cloth is wrapped around the flat wiping surface 311, the wipe head 31 may move the wipe cloth by means of the flat wiping surface 311 to cleanse the portion of the terminal area 210 that is in contact engagement with the flat wiping surface 311.

In an embodiment of the present invention, the liquid supply channels 33 are arranged to extend through the interior of the wipe heads 31 and each has an end connected to the cleansing solvent supply source and an opposite end extending through the flat wiping surface 311 to supply the cleansing solvent to the wipe cloth wrapped around the flat wiping surface 311 so that the wipe cloth may get impregnated with the cleansing solvent to improve the effect of cleansing. In other embodiments of the present invention, the liquid supply channels 33 are not limited to being arranged in the interior of the wipe heads 31 and may be alternatively arranged outside the wipe heads 31. The present invention imposes no limitation to the spatial relationship between the liquid supply channels 33 and the wipe heads 31 and what is required is that the cleansing solvent can be supplied through the liquid supply channels 33 to the wipe cloth to have the wipe cloth impregnated therewith for subsequent wiping operation.

Further, the liquid supply channel 33 is set in an L-shaped having an end extending through a lateral side surface of the wipe head 31 for easy connection with the cleansing solvent supply source and an opposite end extending through the flat wiping surface 311 for readily supplying the cleansing solvent to the wipe cloth provided on the flat wiping surface 311. It is appreciated that the number of the liquid supply channel 33 involved may be just one or plural to enhance the capability of liquid supply to the wipe cloth.

In an embodiment of the present invention, to provide a better effect of cleansing, each of the wiper assemblies 30 may be provided with one individual gas blower assembly 10, but the present invention imposes no limitation to the number of the gas blower assembly 10 involved. It is possible to provide just one gas blower assembly 10, or plural gas blower assemblies 10 may be provided to correspond to each wiper assembly 30. What is required is that during an operation of the wiper assembly 30 wiping the terminal area 210, the gas blower assembly 10 may effectively remove particle foreign substances from the terminal area 210.

In an embodiment of the present invention, the gas supply channel 11 is also arranged in the interior of the wipe head 31, with a structural arrangement similar to that of the liquid supply channel 33 by having an end extending through the lateral side surface of the wipe head 31 for connection with the gas pump and an opposite end extending through the flat wiping surface 311 for supplying the dry and clean pressurized gas generated by the gas pump through the flat wiping surface 311 so that the high pressure gas flow supplied from the gas supply channel 11 may blow away particle-like inorganic foreign substances from the surface of the terminal area 210 opposing the flat wiping surface 311.

It is appreciated that the gas supply channel 11 is not limited to being arranged in the interior of the wipe head 31 and may alternatively be fixed to a sidewall of the wipe head 31. In this invention, no specific limitation is imposed on the spatial relationship between the gas supply channel 11 and the wipe head 31 and what is required is that the gas supply channel 11 may be operated to remove the particle foreign substances from the surface of the terminal area 210 before the wiper assembly 30 starts to wipe the terminal area 210.

In an embodiment of the present invention, the display module terminal cleansing device further comprises an installation section (not shown) for installation and fixing of the wiper assembly 30 and driving the wiper assembly 30 to move relative to the terminal area 210 for wiping and cleansing the terminal area 210 in contact engagement with the wiper assembly 30.

In an embodiment of the present invention, the display module terminal cleansing device further comprises a support section (not shown) for supporting a display module to be cleansed and for driving the display module to move relative to the wiper assembly 30 and/or the gas blower assembly 10 so as to remove foreign substances located on the surface of the terminal area 210 by means of the gas blower assembly 10 and the wiper assembly 30.

Figure 2:
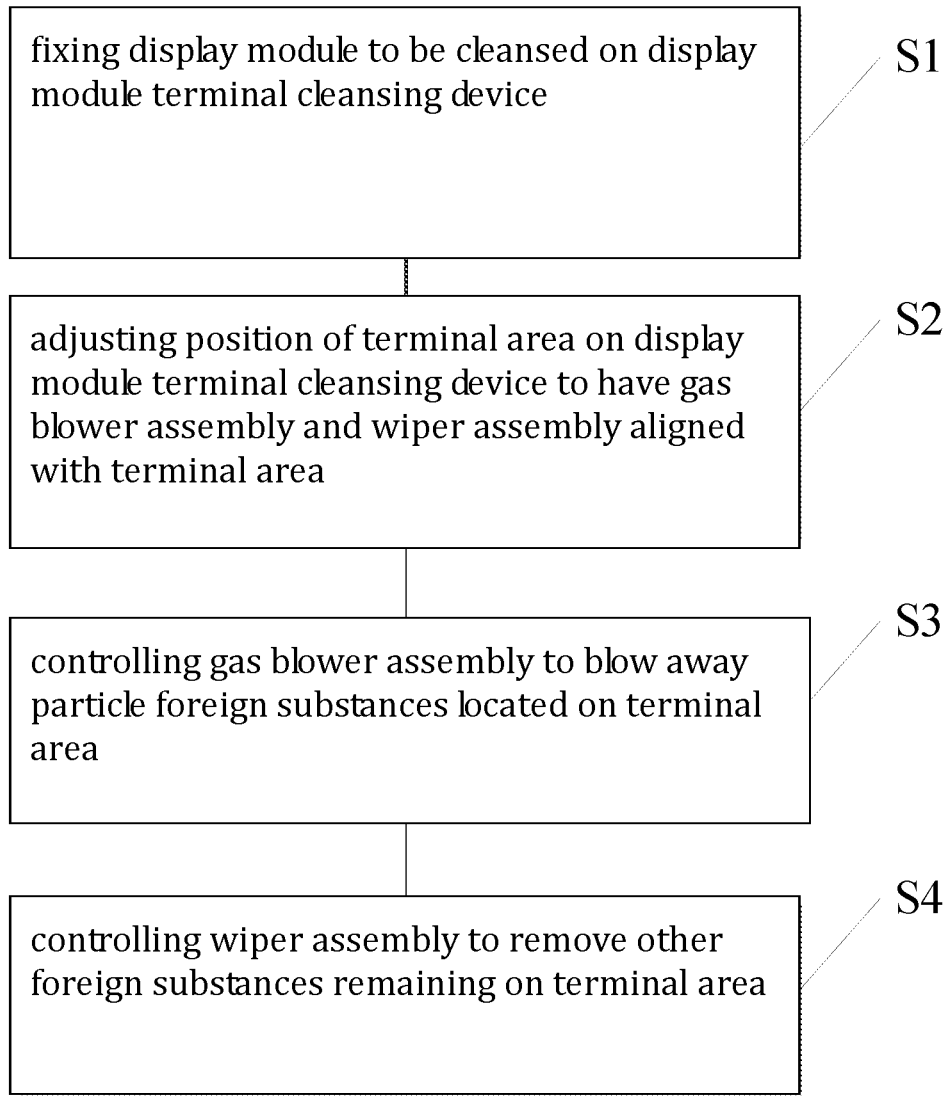
FIG. 2 is a flow chart illustrating a cleansing method, which applies a display module terminal cleansing device shown in FIG. 1 to clean a terminal area of a display module.

Referring also to FIG. 2, FIG. 2 is a flow chart illustrating a cleansing method, which applies the display module terminal cleansing device shown in FIG. 1 to clean a terminal zone of a display module. The cleansing method according to the present invention comprises the following steps:

S1: fixing a display module to be cleansed on a display module terminal cleansing device.

S2: adjusting a position of a terminal area 210 on the display module terminal cleansing device to have a wiper assembly 30 and a gas blower assembly 10 aligned with the terminal area 210.

Specifically, a position of the terminal area 210 relative to the gas blower assembly 10 and the wiper assembly 30 is adjusted such that a gas outlet of the gas supply channel 11 and a wipe head 31 are in alignment with the terminal area 210, and wipe cloth provided on the wipe head 31 is set in contact engagement with a surface of the terminal area 210. In case that the terminal area 210 has a relative size, the gas blower assembly 10 and the wiper assembly 30 must be controlled to move relative to the terminal area 210 in order to complete cleansing of the entirety of the terminal area 210, wherein in a cleansing direction (that is the direction indicated by an arrow in FIG. 1, in which direction the gas blower assembly 10 and the wiper assembly 30 are movable relative to the terminal area 210), the gas blower assembly 10 is arranged at the front while the wiper assembly 30 in the rear so that in a subsequent operation of cleansing the terminal area 210 with the display module terminal cleansing device, it is possible to first remove particle foreign substances from the terminal area 210 with the gas blower assembly 10 and then, other foreign substance (such as organic foreign substances, for example adhesive residues) remaining on the terminal area 210 can be wiped away by means of the wiper assembly 30.

S3: controlling the gas blower assembly to blow away particle foreign substances located on the terminal area.

S4: controlling the wiper assembly to remove other foreign substances still remaining on the terminal area.

Specifically, the gas blower assembly 10 is controlled to supply a high-pressure, clean, and dry gas flow, through the gas supply channel 11, to the surface of the terminal area 210 first, in order to remove particle foreign substances from the surface, and then, the wiper assembly 30 is activated to wipe the surface of the terminal area 210 in contact engagement therewith so as to remove other foreign substances (such as organic foreign substances, for example adhesive residues) remaining on the surface of the terminal area 210 through wiping with the wipe cloth that is impregnated with the cleansing solvent. In case that the terminal area 210 has a relatively large size, the gas blower assembly 10 and the wiper assembly 30 are controlled to move relative to the terminal area 210 and during the course of movement, particle foreign substances are first blown away from the surface by the gas blower assembly 10 and then, foreign substances remaining on the surface are removed through wiping by the wiper assembly 30 so as to complete cleansing of the terminal area 210.

The present invention provides a display module terminal cleansing device and a cleansing method thereof, in which pressurized gas is generated by the gas blower assembly 10 to first blow away particle foreign substances from a surface of a terminal area 210, and then, foreign substances still remaining on the terminal area 210 is wiped off with a wiper assembly 30 operated in combination with a cleansing solvent, whereby an effect of cleansing where water droplet angle on the surface of the terminal area 210 is less than 15° can be achieved after the cleansing and the potential issue of scratching and damaging the display module during the process of cleansing can be avoided.

In the description of the disclosure, the terms "an embodiment", "some embodiments", "an illustrative example", "a specific example", and "some examples" as used herein refer to specific features, structures, materials, or characteristics involved in the embodiment(s) or example(s) are included in at least one embodiment or example of the present invention. In the disclosure, expressions referring to the above mentioned terms may not be referring to the same embodiment or example. Further, the description of the specific features, structures, materials, or characteristics can be combined, through proper arrangements, in any specific one or multiple ones of embodiments or examples.

The above provides a detailed description of an array substrate and a manufacturing method, and a liquid crystal display device, according to embodiments of the present invention. Specific examples are used in the specification to expound the principle and embodying ways of the present invention. The description of the embodiments is provided to help understanding of the method of the present invention, as well as the essential idea thereof. Further, for those having ordinary skills in the art, it can be contemplated to make modifications, based on the idea of the present invention, on the embodiments and applications thereof. In conclusion, the specification should not be interpreted as constraint to the scope of the present invention.

What is claimed is:

1. A display module terminal cleansing device, which is adapted to cleanse a terminal area of a display module, wherein the display module terminal cleansing device comprises a gas blower assembly and a wiper assembly, the gas blower assembly being operable to conduct a gas blowing operation to blow particle foreign substances away from the terminal area of the display module, the wiper assembly being operable to remove foreign substances remaining on the terminal area after the gas blowing operation conducted by the gas blower assembly, wherein the wiper assembly comprises at least two wipe heads, a liquid supply channel arranged in each of the wipe heads, and a piece of wipe cloth wrapped around each of the wipe heads, the liquid supply channel being connected to a cleansing solvent supply section to supply cleansing solvent to the wipe cloth, the wipe heads being operable to drive the wipe cloth that is impregnated with the cleansing solvent to wipe off the foreign substances remaining on the terminal area.

2. The display module terminal cleansing device as claimed in claim 1, wherein the wiper assembly is operable in combination with a cleansing solvent to remove the foreign substances remaining on the terminal area.

3. The display module terminal cleansing device as claimed in claim 2, wherein the foreign substances remaining on the terminal area include organic foreign substances, and the cleansing solvent is selected as one of alcohol, propyl alcohol, and isopropyl alcohol according to the remaining foreign substances.

4. The display module terminal cleansing device as claimed in claim 1, wherein the wipe heads each have an end that forms a flat wiping surface, the wipe cloth being wrapped around the flat wiping surface, the liquid supply channel being arranged to extend through an interior of the wipe head, the liquid supply channel having an end connected to the cleansing solvent supply section and an opposite end extending through the flat wiping surface to directly supply the cleansing solvent to the wipe cloth that is wrapped around the flat wiping surface.

5. The display module terminal cleansing device as claimed in claim 4, wherein the gas blower assembly comprises a gas pump and a gas supply channel connected to the gas pump, the gas supply channel being arranged in the interior of the wipe head to extend through the flat wiping surface to supply gas supplied from the gas pump to a portion of the terminal area that opposes the wipe head.

6. The display module terminal cleansing device as claimed in claim 1, wherein the gas blower assembly comprises a clean dry air module that supplies a high-pressure, dry, and clean airflow.

7. The display module terminal cleansing device as claimed in claim 6, wherein the gas blower assembly comprises a gas pump and a gas supply channel connected to the gas pump, the gas pump being operable to supply high-pressure, dry, and clean gas, the gas supply channel supplying the gas to the terminal area.

8. The display module terminal cleansing device as claimed in claim 1, wherein the terminal cleansing device further comprises an installation section and a support section, the installation section allowing the wiper assembly to be installed and fixed and driving the wiper assembly to move relative to the terminal area, the support section supporting a display module to be cleansed thereon and driving the display module to move relative to the wiper assembly and/or the gas blower assembly.

9. The display module terminal cleansing device as claimed in claim 2, wherein the terminal cleansing device further comprises an installation section and a support section, the installation section allowing the wiper assembly to be installed and fixed and driving the wiper assembly to move relative to the terminal area, the support section supporting a display module to be cleansed thereon and driving the display module to move relative to the wiper assembly and/or the gas blower assembly.

10. The display module terminal cleansing device as claimed in claim 3, wherein the terminal cleansing device further comprises an installation section and a support section, the installation section allowing the wiper assembly to be installed and fixed and driving the wiper assembly to move relative to the terminal area, the support section supporting a display module to be cleansed thereon and driving the display module to move relative to the wiper assembly and/or the gas blower assembly.

11. The display module terminal cleansing device as claimed in claim 4, wherein the terminal cleansing device further comprises an installation section and a support section, the installation section allowing the wiper assembly to be installed and fixed and driving the wiper assembly to move relative to the terminal area, the support section supporting a display module to be cleansed thereon and driving the display module to move relative to the wiper assembly and/or the gas blower assembly.

12. The display module terminal cleansing device as claimed in claim 5, wherein the terminal cleansing device further comprises an installation section and a support section, the installation section allowing the wiper assembly to be installed and fixed and driving the wiper assembly to move relative to the terminal area, the support section supporting a display module to be cleansed thereon and driving the display module to move relative to the wiper assembly and/or the gas blower assembly.

13. The display module terminal cleansing device as claimed in claim 6, wherein the terminal cleansing device further comprises an installation section and a support section, the installation section allowing the wiper assembly to be installed and fixed and driving the wiper assembly to move relative to the terminal area, the support section supporting a display module to be cleansed thereon and driving the display module to move relative to the wiper assembly and/or the gas blower assembly.

14. The display module terminal cleansing device as claimed in claim 7, wherein the terminal cleansing device further comprises an installation section and a support section, the installation section allowing the wiper assembly to be installed and fixed and driving the wiper assembly to move relative to the terminal area, the support section supporting a display module to be cleansed thereon and driving the display module to move relative to the wiper assembly and/or the gas blower assembly.

\* \* \* \* \*